US009792587B2

(12) United States Patent
Caraballoso et al.

(10) Patent No.: US 9,792,587 B2
(45) Date of Patent: *Oct. 17, 2017

(54) ONLINE PLATFORM FOR DESIGN, CREATION, MAINTENANCE, AND INFORMATION SHARING OF A GARDEN

(71) Applicant: GREAT WEB GARDEN SHARE, INC., Swarthmore, PA (US)

(72) Inventors: Esteban A. Caraballoso, Swarthmore, PA (US); Nicholas B. Lawing, Swarthmore, PA (US)

(73) Assignee: GREAT WEB GARDEN SHARE, INC., Swarthmore, PA (US)

(*) Notice: Subject to any disclaimer, the term of this patent is extended or adjusted under 35 U.S.C. 154(b) by 243 days.

This patent is subject to a terminal disclaimer.

(21) Appl. No.: 14/291,040

(22) Filed: May 30, 2014

(65) Prior Publication Data
US 2015/0347544 A1 Dec. 3, 2015

(51) Int. Cl.
*G06F 17/30* (2006.01)
*G06Q 10/10* (2012.01)
*G06F 3/0484* (2013.01)
*G06F 3/0482* (2013.01)
*G06Q 50/02* (2012.01)

(52) U.S. Cl.
CPC .......... *G06Q 10/10* (2013.01); *G06F 3/0482* (2013.01); *G06F 3/04842* (2013.01); *G06Q 50/02* (2013.01)

(58) Field of Classification Search
USPC .......................... 707/723, 732, 705; 345/629
See application file for complete search history.

(56) References Cited

U.S. PATENT DOCUMENTS

| | | | |
|---|---|---|---|
| 8,803,912 B1* | 8/2014 | Fouts | G06T 19/006 345/629 |
| 9,271,454 B1* | 3/2016 | Shochat | A01G 27/003 |
| 2009/0216661 A1* | 8/2009 | Warner | G06Q 30/02 705/26.1 |
| 2011/0093281 A1* | 4/2011 | Plummer | G06F 19/363 705/2 |
| 2014/0279181 A1* | 9/2014 | Wills | A01G 9/02 705/26.5 |
| 2015/0052130 A1* | 2/2015 | Chang | G06F 17/3087 707/732 |

* cited by examiner

*Primary Examiner* — Hung T Vy
(74) *Attorney, Agent, or Firm* — Franco S. De Liguori; DP IP Group

(57) ABSTRACT

An online platform for design, creation, maintenance, and information sharing of a garden is disclosed. A user interface is generated for receiving information from a user relating to a garden. In response to receiving information from the user, a selection of plant varieties is generated based on garden geotagging and environmental information. At least one, dynamically maintained plant database of user created garden knowledge is provided. Identification searches are performed by using geometry-based botanical properties in a visual search.

22 Claims, 18 Drawing Sheets

| Plant Properties | Data Type / Options | Unit of Measure |
|---|---|---|
| Plant ID Number / Key | Int | |
| Name | VarChar | |
| Location | VarChar / Continent + Country + City + Region + Locality, GPS, Zip | |
| Native Habitat | VarChar / Continent + Country + City + Region + Locality, GPS, Zip | |
| Optimal Temperature | Int | Temperature |
| Edible | Yes / No / Partial (Include what part) | |
| Poisonous | Yes / No / Partial (Include what part) | |
| Horticultural Binomial Name | VarChar | |
| Time of First Flower From Seed | Int | Time (Hours, Days, Weeks, Years...) |
| Flowering Time | Drop Down / Time of Year (Jan, Feb, July,..., Summer, Spring | |
| Flowering Type | Drop Down / Flower Table | |
| Time for Germination | Int | Time (Hours, Days, Weeks, Years...) |
| Plant Type | Flower / Tree / Shrub | |
| Kingdom | Drop Down / Kingdom Table | |
| Division | Drop Down / Division Table | |
| Phylum | Drop Down / Phylum Table | |
| Class | Drop Down / Class Table | |
| Order | Drop Down / Order Table | |
| Family | Drop Down / Family Table | |
| Subfamily | Drop Down / Subfamily Table | |
| Genus | Drop Down / Genus Table | |
| Species | Drop Down / Species Table | |
| Plant Image(s) | Sleek display of associated images. With expand and zoom capabilities | |
| Time for First Transplant | int | Time (Hours, Days, Weeks, Years...) |
| Time for Feeding | int | Time (Hours, Days, Weeks, Years...) |

*Fig. 16*

| Plant Properties | Data Type / Options | Unit of Measure |
|---|---|---|
| Amount to Feed | int | Volume (teaspoon, cup, quart) |
| Required Hours of Light | int | Time (Hours, Days, Weeks, Years...) |
| Optimal Hours of Light | int | Time (Hours, Days, Weeks, Years...) |
| Required amount of water | int | Volume (teaspoon, cup, quart) |
| Optimal amount of water | int | Volume (teaspoon, cup, quart) |
| Optimal Propagation via cutting time / period | Drop Down / Time of Year (Jan, Feb, July,..., Summer, Spring | |
| Optimal pruning time / period | Drop Down / Time of Year (Jan, Feb, July,..., Summer, Spring | |
| Deadheading | Yes / No / Partial | |
| Time to Maturaty | int | Time (Hours, Days, Weeks, Years...) |
| Ideal Climate | Text / Location Information | |
| Aquatic | Yes / No / Partial | |
| Common Pest(s) | Multiple Allowed Selections from Pests Table | |
| Common Disease(s) | Multiple Allowed Selections from Disease Table | |
| Ideal pH | Drop Down / pH Table | |
| Ideal Soil | Multiple Selections with multiple % - Drop Down / Minerals Table | |
| Ideal Drainage | Drop Down / Drainage Type Table | |
| Ideal Nutrients | Listing of nutrients associated with a plant | |
| Ideal Nutrient Sequence | Listing of nutrients associated with a plant in an optimal sequence | |
| Water evaporation rate | Int | mass / ( volume * seconds) |
| Leaf type - Germination | Drop Down - Selection / from Leaf Table | |
| Leaf type - First True Leaves | Drop Down - Selection / from Leaf Table | |
| Leaf type - Mature Leaves | Drop Down - Selection / from Leaf Table | |
| Stem type - Mature | Drop Down - Selection / From Stem Table | |
| Stem-type - Germination | Drop Down - Selection / From Stem Table | |
| Flower Shape Properties 1...n | Drop Down - Selection / From Flower Table | |

Great Web Garden Share, Inc. Proprietary
© 2010 - 2012 Great Web Garden Share, Inc.

*Fig. 17*

| Plant Properties | Data Type / Options | Unit of Measure |
| --- | --- | --- |
| Flower Identification Properties 1....n | Drop Down - Selection / From Flower Table | |
| Flower ID # | Drop Down / source: Flower Table | |
| Leaf ID # | Drop Down / source: Leaf Table | |
| Visual Search Property 1....n | Drop Down / Free Form VarChar. Used as tag for searching | |
| Listings of Shared Gardens with this plant | Selection / myGarden With Plant AND Shared | |
| Gardener Comments | Comments Field | |
| Gardener Ratings | Ratings can be assigned to Gardeners, transactions, events, plants. Gardener security will have an effect on weight. | |
| Plant Activity History by Region | Calculated field based on previous time data | |
| Days to Seed | Int | Time (Hours, Days, Weeks, Years...) |
| Time of Year for Seed | Range | Time (Hours, Days, Weeks, Years...) |
| Minutes to Prune per Prune | Int | Time |
| Prunes per Year | Int | Length |
| Growth Rate | Int | Length per Time |
| Yearly Care Tasks | Multiple Selection from Tasks Table | Length |
| Plant Maintenance Task Reminder (1...n) | Function to send reminder emails based off of defined relationships between plant properties and XML / external data | |

*Fig. 18*

ONLINE PLATFORM FOR DESIGN, CREATION, MAINTENANCE, AND INFORMATION SHARING OF A GARDEN

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

Technical Field

The present disclosure is directed to online platforms, and particularly to online platforms relating to gardening.

Background Information

There are many gardening websites on the web. These sites will typically give information on plants, when to water and how much, and other information typically drawn from books and gardening related materials.

These sites are not particularly user friendly, or at least not garden-creation friendly.

It is desirable for users to be able to have access to online platform tools that make garden creation user friendly, fun to use, and feature-rich. One such example is the online platform of U.S. Non-Provisional application Ser. No. 14/214,982 filed on Mar. 16, 2014 which is hereby incorporated by reference.

SUMMARY

The present disclosure describes an enhanced online platform for the design, creation, maintenance, and information sharing of a garden (garden platform).

The online platform is an online environment where users (gardeners) go to plan, create, grow and/or share gardens with other members. A set of garden specific feature tools track and organize the garden. The term "user" or "users" may refer to members of an online community, wherein one particular user may have access to more features and privileges than another particular user, as is known in the art.

A feature of the online platform is an encyclopedia of plant knowledge that provides members with information on when (and how) to maintain plants in one's garden. In one scenario, the information is geographically and environmentally relevant. In another scenario, sensors are used to collect relevant time-stamped garden information, including, but not limited to, temperature, humidity, wind speed.

In a further scenario, a calendar of gardening tasks is automatically generated from the list of plants selected to grow. Based on the selection of plants identified by a user, the online platform will return a set of gardening selections, instructions, or guidelines as best gardening practices to follow. Plant experiments may be conducted and shared among users and may be tracked with the online platform. The garden user interface digitally represents the physical layout of the garden, allowing for easy planning.

In yet a further scenario, the online platform is made interactive, or otherwise social community based, with other users being able to answer questions, and/or contribute gardening tips. A bartering system is provided that allows users to buy, sell, and trade plants or skills.

In another scenario, a plant identification search module or tool is provided. This module allows the uploading of images, which are scanned, and compared against other images in a database to help the member identify the variety in question. In another scenario, the plant identification tool is dynamically interactive with the user where the tool poses questions to the user in order to identify a plant in the database. The questions posed to the user can be of multiple choice images, yes or no and text. Questions are asked based upon specificity and similarity to provide the most robust visual search possible.

Once identified, more detailed information is made available via a plant encyclopedia database link. An easy-to-navigate user interface is provided for this purpose.

The summary is neither intended nor should it be construed as being representative of the full extent and scope of the present disclosure, which these and additional aspects will become more readily apparent from the detailed description, particularly when taken together with the appended drawings.

BRIEF DESCRIPTION OF THE DRAWINGS

FIG. 16 shows specific properties of plant information contained within a specific plant record in The Plant Book, the proper name given to GWGS plant database.

FIG. 17 shows additional specific properties of plant information contained within a specific plant record in The Plant Book, the proper name given to GWGS plant database.

FIG. 18 shows additional specific properties of plant information contained within a specific plant record in The Plant Book, the proper name given to GWGS plant database.

DETAILED DESCRIPTION

Figure 1:
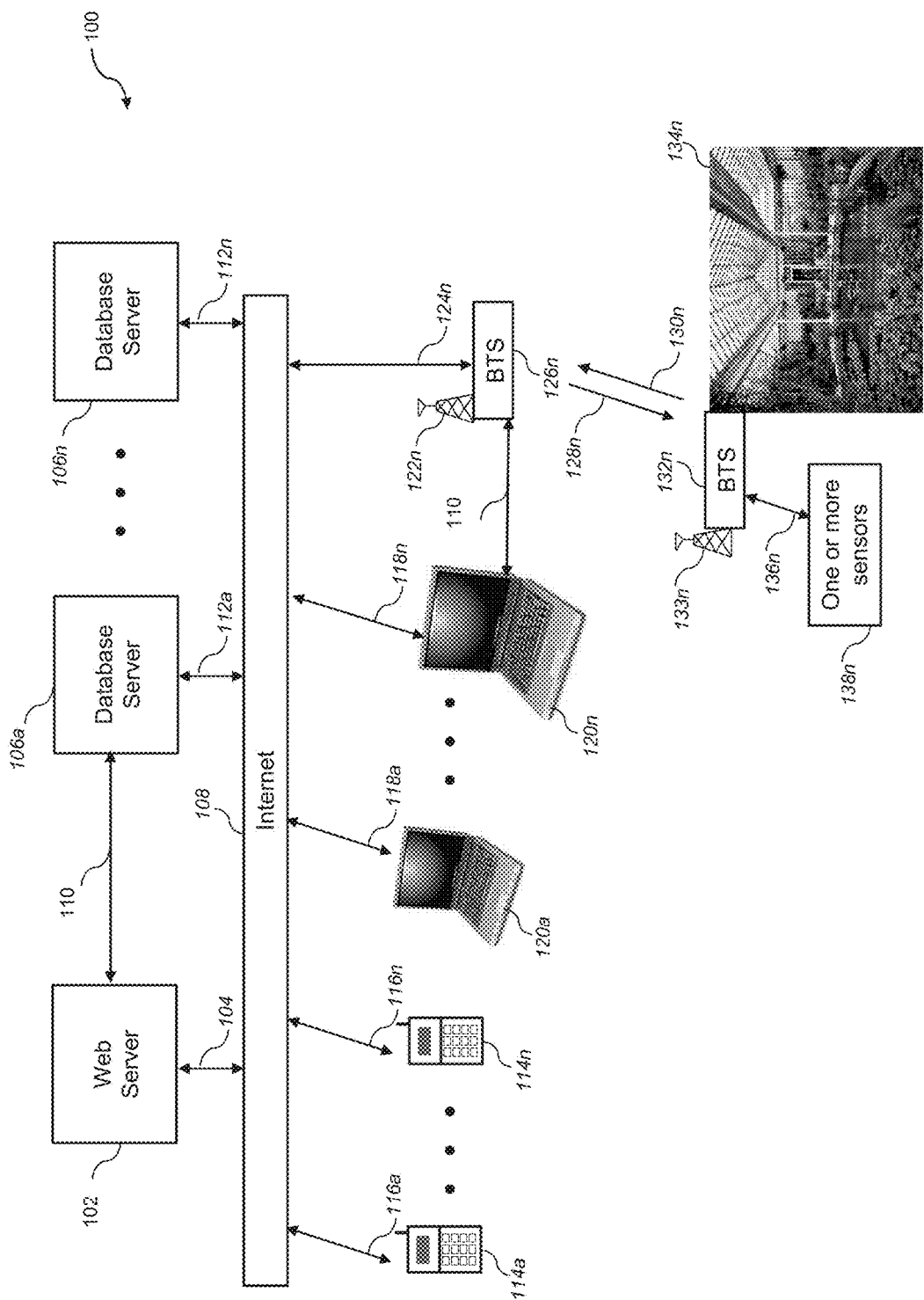
FIG. 1 shows an enhanced online platform for design, creation, maintenance, and information sharing of a garden ("garden platform") in accordance with the present invention.

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein. The terms "online," "internet," and "World Wide Web" are used interchangeably as is known in the art. The term "garden" may represent any live plant or plurality of plants that share a common area as is known in the art. Plants include annuals and perennials, including, but not limited to, trees, shrubs, bushes, flowers, and vegetables as is known in the art.

The present disclosure describes an enhanced online platform for the design, creation, maintenance, and sharing of information of a garden or a plurality of gardens (hereinafter "platform" or "garden platform"). The enhancement over other existing platforms, such as U.S. Non-Provisional Ser. No. 14/214,982 includes, but is not limited to, more robust bartering, robust garden environmental data collections, and enhanced visual search capabilities.

A feature of the garden platform is an encyclopedia of plant knowledge that provides users with information on when (and how) to maintain plants in one's garden. In one scenario, the information is geographically and environmentally relevant.

In a further scenario, the platform is made interactive, or otherwise social community based, with other users being able to answer questions, and/or contribute gardening tips.

In another scenario, a plant identification search module or tool is provided. This module allows the uploading of images, which are scanned, and compared against other images in a database to help the member identify the variety in question. In another scenario, the plant identification sub-process is dynamically interactive with the user where the tool poses questions to the user in order to identify a plant in the database. The questions posed to the user can be of multiple choice images, yes or no and text. Plant visual identification uses an algorithmic specificity approach, decreasing the search time of a user.

Once a plant is identified via a visual search, more detailed information is made available via a plant database link. An easy-to-navigate user interface is provided for this purpose.

A necessary feature for this kind of collaborative effort is a centralized database for gardening information. The centralized database must be available to all users and be dynamically modifiable. The centralized encyclopedia can also serve as the reservoir for detailed plant care information, such as the required hours of light a plant may need per day. An aggregate of collected information can be used to define detailed reminders which can be sent to the user, based on the plants which they have on their individual garden plant lists.

The garden platform according to the present invention provides the ability to post listings for the sale of goods and services related to gardening including the plants themselves ("barter system"). This is in addition to being able to perform a visual search which allows the user to identify plants using image based or geometry based botanical properties.

The problem with most gardening websites available today is that they do not offer a feature rich platform that allows for (i) donation of goods and services to a second party or user; (ii) a digital reservoir of user and administrator created garden knowledge, including a plant encyclopedia which is dynamically maintained containing plant facts, plant requirements, important times of year, how to tend information and other digital content including videos, pictured and posted user comments and blogs; (iii) communicating and collaborating on garden tasks, e.g., sharing a calendar and email system as well as planning and task sharing and service bartering; (iv) exchanging and trading goods and services directly for goods and services without the need for currency (futures contracts); creating a digital representation of the plants a user may have in their garden; (v) automatically populating a calendar with gardening tasks based on plants which a user has in their digital garden; (vi) sending reminders of scheduled garden tasks to other users and themselves; (vii) user posting of goods and services for sale and trade; (viii) users negotiating exchanges of goods and services; (ix) performing plant identification searches by using geometry-based botanical properties in a visual searches for any plant in the database using a subtractive or exclusionary algorithm; (x) adding or requesting of new varieties by a member to an administrator so as to enhance plant database; and/or (xi) integrated user-location based weather feed that sends users weather based alerts e.g., to alert to increase (decrease) watering period or frequency during expected dry (wet) weather conditions.

One of the reasons plants don't survive or grow poorly is because they outgrow their space. The garden platform according to the present invention includes features that provide guidance regarding optimum space conditions for any selected plant. In another scenario, the user describes the environment he/she has to work with, including location, sun/shade conditions, physical constraints, etc. and the platform provides a selection of plants, along with images and descriptions, to suit those conditions. In another scenario, the platform considers or recommends, if necessary, optimum soil conditions, as well as information as to compatibility between selected varieties if sharing soil, for example.

In another scenario, the platform provides personalized gardening task feedback. Based on the selected garden plants, an alert feature lets the member know the optimal time to trim the roses, send a reminder about doing so, potentially including a how-to video along with additional information.

FIG. 1 shows an enhanced online platform 100 for design, creation, maintenance, and information sharing of a garden ("garden platform") in accordance with the present invention. Web server 102 is coupled to Internet 108 through connection 104. The hardware components that comprise web server 102 and connection 104 are well known in the art. Web server 102 delivers content through the World Wide Web to at least one of portable computing devices 114*a*, . . . , 114*n* or non-portable computing devices 120*a*, . . . , 120*n*.

Information displayed on portable computing devices 114a, . . . , 114n and non-portable computing devices 120a, . . . , 120n may also refer to "client side" interactions as is known in the art. Connection methods 116a, . . . , 116n which couple portable computing devices 114a, . . . , 114n to Internet 108 may be wireless or wired. Examples of wireless connection methods 116a, . . . , 116n are cellular connections implementing wireless standards such as LTE or 3GPP and other wireless connections such as Bluetooth and Wifi as is known in the art. Examples of wired connection methods 116a, . . . , 116n are universal serial bus (USB). Similarly, connection methods 118a, . . . , 118n may be wireless or wired. Connection methods 118a, . . . , 118n may use additional technologies, for example, Ethernet, as is known in the art.

In another aspect, garden platform 100 further comprises one or more sensors 138n, for n=1,2,3. Examples of one or more sensors 138n include, but are not limited to, temperature, humidity, daylight sensor, and GPS position sensors. Sensors 138n are placed in a user's garden 134n wherein the highest accuracy or desired ecological and geographical information conducive to maintaining and growing of a garden may be captured. One or more sensors 138n may be coupled to BTS (base station transceiver) 132n via connection 136n. Connection 136n may comprise various wireless or wired interface technologies known in the art. Some examples include, but are not limited to, wired connection via USB etc., direct wired analog voltages, wireless connections such as Bluetooth, Wifi etc. BTS 132n comprises a microprocessor, memory, A/D converters and other components as is known in the art. BTS 132n samples data from one or more sensors 138 at a predetermined time interval, with a relative time stamp. BTS 132n then transmits one or more sensors 138n information wirelessly through antenna 133n to BTS 126n that is coupled to antenna 122n through wireless uplink 130n and wireless downlink 128n. BTS 126n may be coupled to non-portable computing device 120n wherein one or more sensors 138n information may be stored. Non-portable computing device 120n may also relay one or more sensors 138n information to web server 102 through methods 120n would normally communicate with web server 102. BTS 126n may also be more directly coupled to web server 102 through connection 124n, wherein connection 124n may be a wired or wireless connection to the internet as is known in the art. Similarly, all portable computing devices 114a, . . . , 114n and non-portable computing devices 120a, . . . , 120(n-1) may have one or more sensors corresponding to other user's gardens as exemplified by garden 134n.

Garden platform 100 further comprises database servers 106a, . . . , 106n which are coupled to Internet 108 via connection methods 112a, . . . , 112n as is known in the art. Database servers 106a, . . . , 106n may be co-located in the same physical location as web server 102 or may be remotely located, or may be a combination of co-located and remote servers. In one aspect of the present invention, database server 106a contains a database of digital content comprised of gardening related information including plant information in the form of video, audio, and/or text. For weather information, it is convenient to use database servers from third parties such as The Weather Channel etc., as is known in the art. In another aspect, web server 102 may be coupled to database servers 106a, . . . , 106n via alternate network connection 110. Alternate network connection 110 may be used when database server 106a is co-located with web server 102. An example of alternate network connection 110 is an Ethernet connection through a router. Great Web Garden Share (GWGS) is a commercial instantiation and demonstration of garden platform 100.

Figure 2:
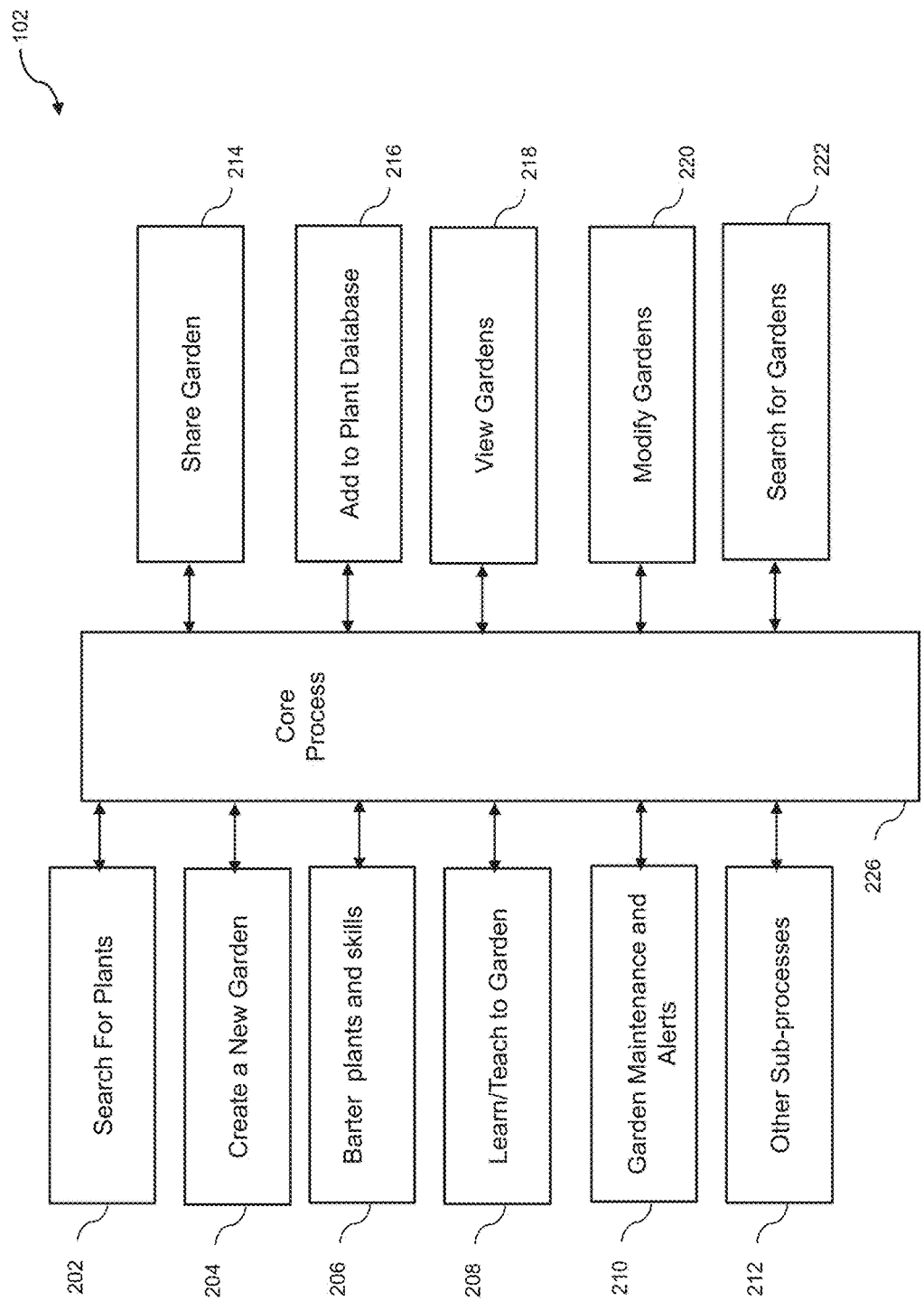
FIG. 2 shows a high level functional representation of a garden platform web server and sub-processes in accordance with the present invention.

FIG. 2 shows a high level functional representation of garden platform web server 102 and sub-processes in accordance with the present invention. Core process 226 implements garden platform web server 102 functionality and serves content to computing devices as noted above. Core process 226 is coupled to sub-processes through methods known in the art. Sub-processes may consist of subroutines of machine readable code that implement specific functions in a real-time or non real-time manner. Sub-processes may also operate on other web servers and are coupled to core process 226 through methods mentioned above.

Sub-process 202 implements the search for plants functionality of garden platform 100. A graphical user interface (UI) enables searching for a plant by uploaded or stored images which is a valuable feature, especially if a garden exists with plants that are of unknown origin or unidentified plants. Furthermore, sub-process 202 enables searching for a plant by name, type of plant, genus, species, climate type, leaf type, water needs, light needs, difficulty of care, and additional plant properties. Additional detail of search for plants sub-process 202 is in FIGS. 6 and 7 and described further below.

Figure 9:
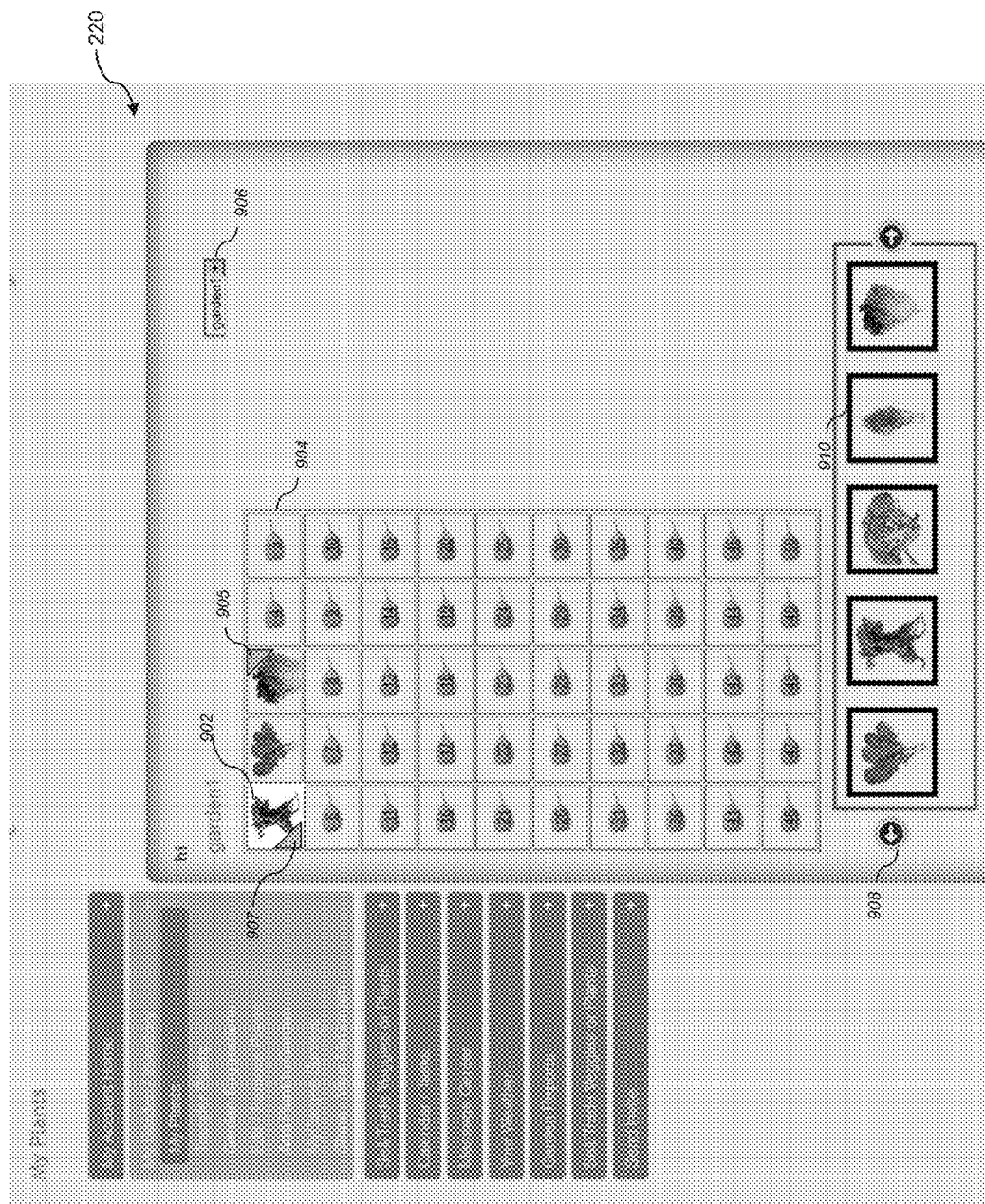
FIG. 9 shows another aspect of a display user interface (UI) of the Great Web Garden Share (GWGS) modify gardens sub-process in accordance with the present embodiment.

Sub-process 204 implements the create a new garden functionality of garden platform 100. A graphical user interface (UI) enables the creation of a new garden which is configured. Sub-process 204 may include identifying garden plants which may comprise a garden experiment. A garden experiment may comprise any of several aspects of experimentation as is known in the art. One example of a plant experiment may be to investigate the results of hybrid pollination of multiple plants. Another example may be to alter watering and maintenance schedules. A user can define a plant as experimental when adding the plant to their garden through the create new garden functionality of sub-process 204 wherein the plant graphical user interface layout may then include a visual identifier. FIG. 9 shows an example graphical user interface of experimental visual identifier 905. In the example, visual identifier 905 comprises a triangle overlaid with the plant representation deemed to be an experiment in the user's garden. Other general visual alert mechanisms such as altering visual identifier 905 color, shape, highlighting, and alert positioning, and other instances of visual identifiers may also be considered and equivalent instances of visual identifiers.

Sub-process 206 implements the ability to seek out plants from other users that may be for sale, or plants that may be for trade. The ability to offer plants for sale and trade is also implemented by sub-process 206. Methods for searching and completing purchases, sales, and trades are detailed in FIGS. 3-5 and described further below.

Sub-process 208 implements the learn or teach to garden module. Video, audio, and textual informational archives may be presented to facilitate the learning of gardening, as is known in the art.

Sub-process 210 implements the garden maintenance and alerts functionality. This sub-process may include a calendar and may combine at least one of an alert item type in a database to perform some type of maintenance. Example alerts may be to water the garden due to extreme weather conditions or to cover the garden when the outside air temperature is too cold. More information on sub-process 210 is provided below. Alerts can be constructed by multiple methods. When a user defines a plant which is added to their on-line garden the user will automatically be able to access information on when to perform certain gardening tasks associated to the plant or plants which they have selected from the list. This information is automatically presented to the user and the offer is made to remind the user of when to perform these tasks. Furthermore, sub-process 210 may further include providing in a graphical user interface, a visual alert. FIG. 9 contains an example of visual alert 907, indicating that there is a current, historical, or pending item requiring the user's attention. In the example, the visual alert comprises a triangle overlaid with the plant representation in the user's garden. Other general alert mechanisms such as altering visual alert's 907 color, shape, highlighting, and alert positioning, and other instances of visual alerts may also be considered and equivalent instances of visual alerts.

Sub-process 214 enables the sharing of a garden and garden data with another user or a plurality of users of garden platform 100. When a garden is shared, an alert from sub-process 210 may be created to notify the user or users that a garden has been shared. Hyperlinks may be provided in the alert to easily allow a user access to a garden that has been shared with them. Methods of information sharing are known in the art in many online communities such as Linkedin, Facebook, and others.

Sub-process 216 enables the addition of plant information to a database. Sub-process 218 is the view gardens sub-process. Sub-process 220 enables the user to select, modify, and alter their garden. A graphical user interface (UI) is presented to facilitate the modification process. Sub-process 222 is the search for gardens feature wherein a user can search for other users, garden types by climate, plant type, size, or other parameters as depicted in FIGS. 16-18.

Additional sub-processes 212 may be coupled to core process 226 to provide functionality that web-based users expect as is known in the art. Sub-processes 212 include, but are not limited to, user registration, registration of an advertiser, displaying of advertisements, donate money to various causes, email and messaging functionality, password protected user login, forgot password recovery, entering and editing of personal information, register as a user with increasing user privileges, starting or inviting or joining a chat session, viewing of calendar of events, adding of geolocation data, search or browse bulletin board information, comment on bulletin board, provide commentary, donate, pay a subscription fee, create or edit up-coming community events, view local weather, view historical weather trends, comment on weather, view tutorials, request technical support, post instructional information, view advertisement reports, upload images, pay for advertising, reset password, approve or edit bulletin board posts, view bulletin board statistics, generate backups of data or website, restore backed up data, perform platform maintenance, and batch import of database data among others. These additional sub-processes are generally known in the art and are mentioned generally as features that are generally desirable among popular online platforms.

Figure 3:
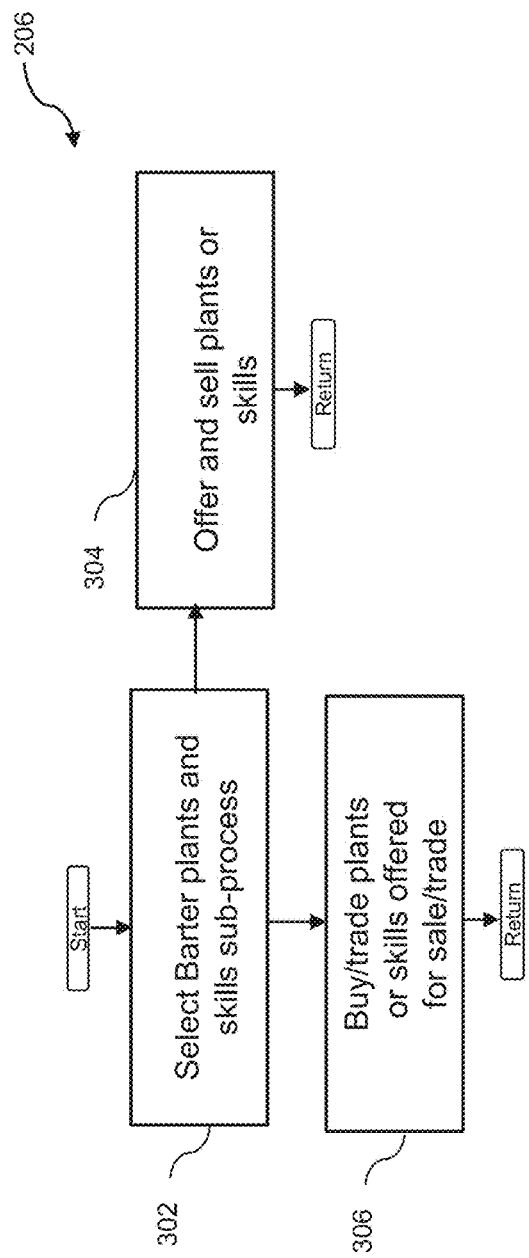
FIG. 3 is a high level operational flow diagram of a sub-process to barter plants and skills in accordance with the present invention.

FIG. 3 is a high level operation flow diagram of sub-process 206 to barter plants and skills in accordance with the present invention. Sub-process 206 begins at block 302 where the user is queried via a graphical user interface (UI) as to what type of barter functionality they wish to perform. Example UIs as known in the art may comprise a drop down menu. Barter plants and skills sub-process comprises two additional processes: offer and sell plants or skills 304 and buy/trade plants or skills offered for sale/trade 306. Each is respectively selected depending on which barter functionality is selected by the user. The term "offer" may include a trade, exchange, or the combination of a trade and financial consideration.

Figure 4:
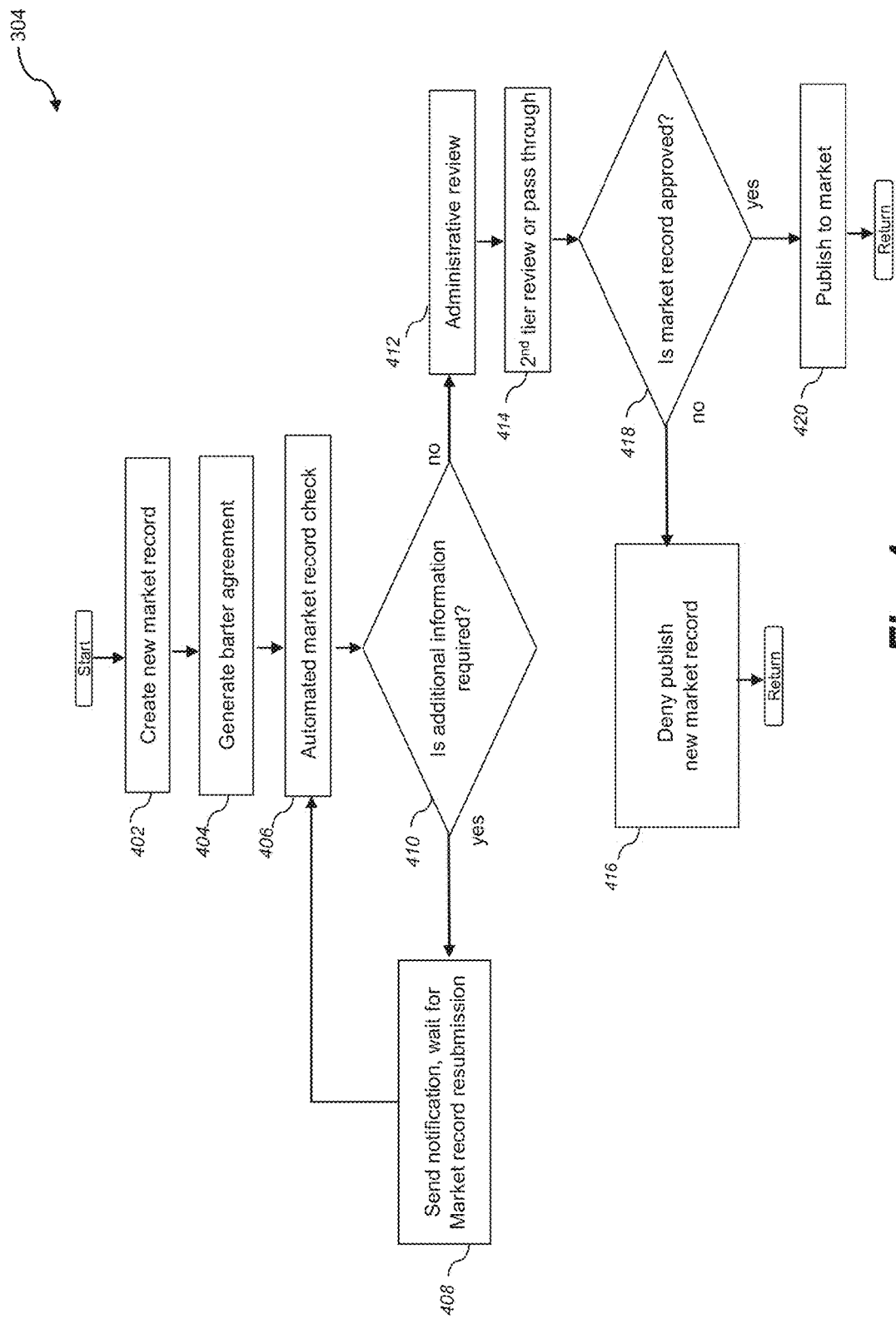
FIG. 4 is a high level operational flow diagram of a sub-process to offer and sell plants or skills in accordance with a preferred embodiment.

FIG. 4 is a high level operational flow diagram of sub-process 304 to offer and sell plants or skills in accordance with a preferred embodiment. Flow begins at block 402 wherein sub-process 304 creates a new market record based upon data such as textual, image, or video input from user. A market record is a record stored in a database that when the status becomes "publish," the record has been approved by an administrative user and published to garden platform 100 community for public viewing and consumption. Initially, the submitted new market record is "un-published," pending review. Once information to create the new market record has been entered and submitted, flow continues to block 404. Block 404 comprises the generate barter agreement functionality wherein a legally binding sales contract is generated, associated, and presented to the user who created the new market record. After the barter agreement is created in block 404, flow continues to block 406 wherein the new market record data is checked to ensure there is enough information entered into the new market record. There may be a minimum required amount of data to be entered for block 402 to create a new market record. The minimum amount of required data may be configurable by a user of garden platform 100 that has administrative rights. For example, there may be a minimum requirement to list at least one plant, determine if there is a sale or trade transaction to be made, and if there is a sale transaction, a price may be required. Block 410 is the automatic check module which determines if there is additional information required. If block 410 determines that additional information is required (yes), then flow continues to block 408 wherein a notification is sent to the user who created the new market record to update and re-submit the new market record with the additional required information. If block 410 determines that no additional information is required (no), then flow continues to block 412 from block 410. Block 412 sends the new market record to an administrative user for review. The administrative user conducting the review in block 412 may determine that a $2^{nd}$ tier review may be necessary, wherein flow would continue to block 414 wherein a $2^{nd}$ tier reviewer is notified to review the new market record. The administrative user completing the administrative review in block 412 may determine that there is no need for a $2^{nd}$ tier review, in which case, block 414 serves as a pass through function. Flow then continues to block 418 wherein it is determined if the new market record is approved after having processed by blocks 412 and 414. If the market record is approved (yes), then flow continues to block 420 wherein the status of the new market record is updated to publish, and the new market record is then available for search, display, and actions of the general user base of garden platform 100. If block 418 determines that the market record is not approved (denied), then flow continues to block 416 wherein the user who created the new market record is notified that the new market record is denied. The market record is then placed in a draft state wherein the user who created the new market record may change the record and resubmit at a later time.

Figure 5:
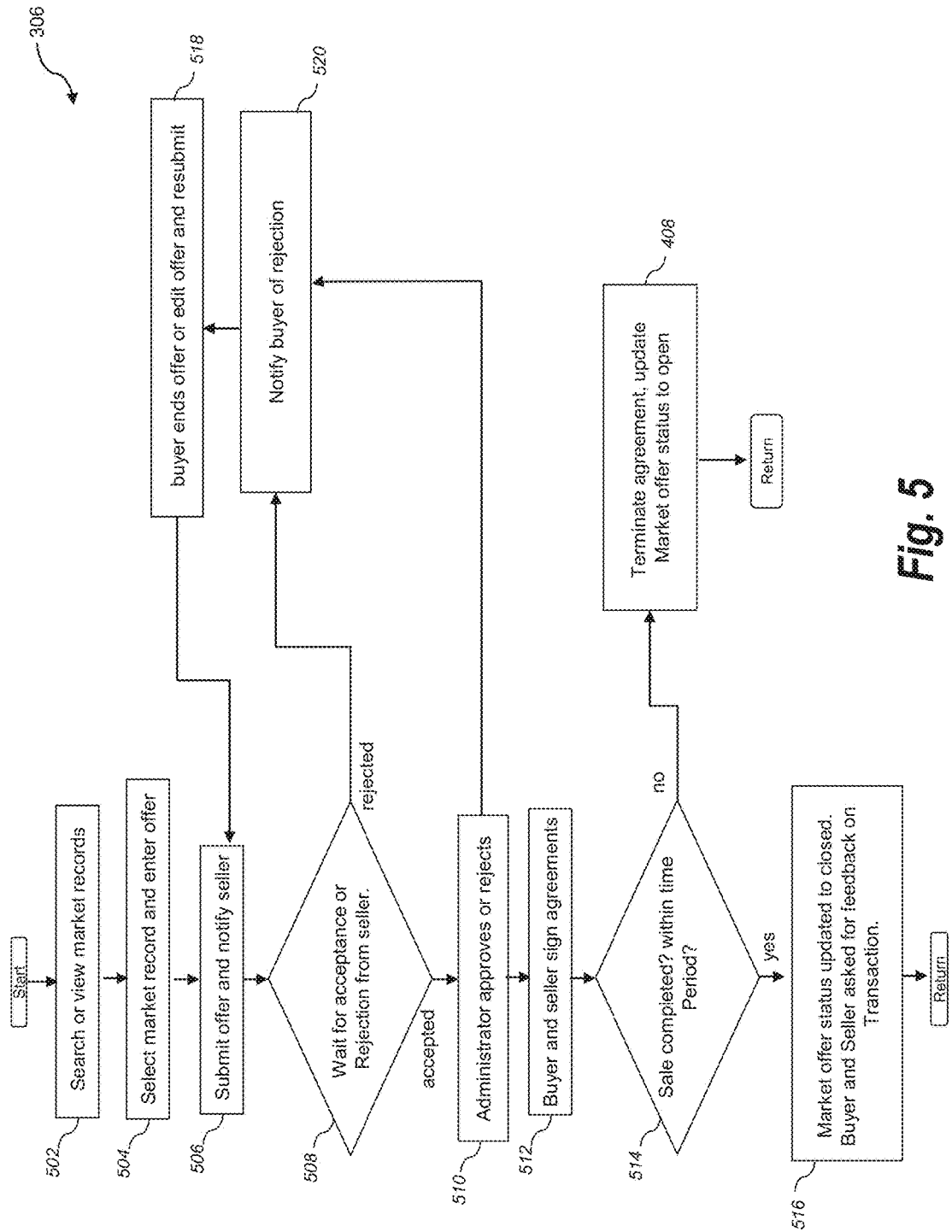
FIG. 5 is a high level operational flow diagram of a sub-process to buy/trade plants or skills that are currently offered for sale or trade in accordance with the preferred embodiment.

FIG. 5 is a high level operational flow diagram of sub-process 306 to buy/trade plants or skills that are currently offered for sale or trade in accordance with the preferred embodiment. Flow begins at block 502 wherein a user selects to search or view market records. When viewing market records, a user may browse through a list of new market records that are published in a sorted order, such as most recent published market records first. Furthermore, a user may be prompted to search based upon constraining certain parameters, including, but not limited to, price, plant type, or name, as is known in the art. A graphical user interface (UI) displays relevant market records to the user. Flow then continues to block 504 wherein a user selects a market record and an offer to purchase the goods or services is entered into garden platform's 100 database. The offer may comprise an offer for the asking price, or it may be a counteroffer. Flow then continues to block 506 wherein the offer is submitted and the market record seller, i.e., the user who created the market offer to sell plants or skills, is notified of the offer. Flow then continues to block 508 wherein an "accept" or "reject" is received by garden platform 100 from the market record seller. While block 508 waits to receive a response from the market record seller, the status of the corresponding published market record status is updated to "offer submitted" in order to let garden platform 100 community know that there is a pending offer on the market record. Block 508 may also have a time constraint wherein the seller has to respond to the offer within a predetermined time window. For example, the market record seller may have 72 hours to respond to an offer wherein if a response from the market record seller is not entered, the offer is automatically rejected and flow would continue to block 520. In the case of no response within a predetermined time interval, the buyer is notified with the reason for offer rejection in block 520. Flow would then continue to block 518 wherein the potential buyer may end the offer, edit and submit a new offer, or resubmit the offer. Flow would then continue to block 506. If block 508 receives a rejection from the market record seller, flow continues to block 520 wherein the buyer is notified of the rejection, and any message from the market record seller is relayed in the notification to the potential buyer. Flow would then continue to block 518 wherein the potential buyer may end the offer, edit and submit a new offer, or simply resubmit the offer at which point flow would continue to block 506. If the offer is accepted by the market record seller then flow would continue to block 510 wherein an administrator may need to approve or reject the offer. If the administrator rejects the offer, flow then continues to block 520. An administrator user may reject an offer, for example, if there is evidence that the transactions and offers are improper or there may be a dispute with a particular seller or buyer with another market offer. Once an administrator user has approved the market record offer, flow continues to block 512 wherein the barter agreement generated in block 404 is signed by both the market record seller and buyer. The signing of the barter agreement may take place via actual signatures, or may be electronically signed, as is known in the art. Once signing of agreements has taken place in block 512, garden platform 100 checks to see if the sale is consummated via completed transfer of goods (plants, services etc.) and money (if applicable). The sale may also be subject to a time limit wherein the consummation of the sale must be completed within a predetermined time interval. If the sale has not completed within a predetermined time interval, flow continues to block 408 wherein the sale, barter agreement is terminated. The public status of the market record that was pending a sale is moved back to "open." If the sale is consummated within the predetermined time interval, then flow continues to block 516 wherein the market offer status is updated to closed. Notices to both buyer and seller are sent to get feedback on the quality of the transaction. This type of seller and buyer feedback mechanism is known in the art, and is as implemented in Amazon.com, for example.

Figure 6:
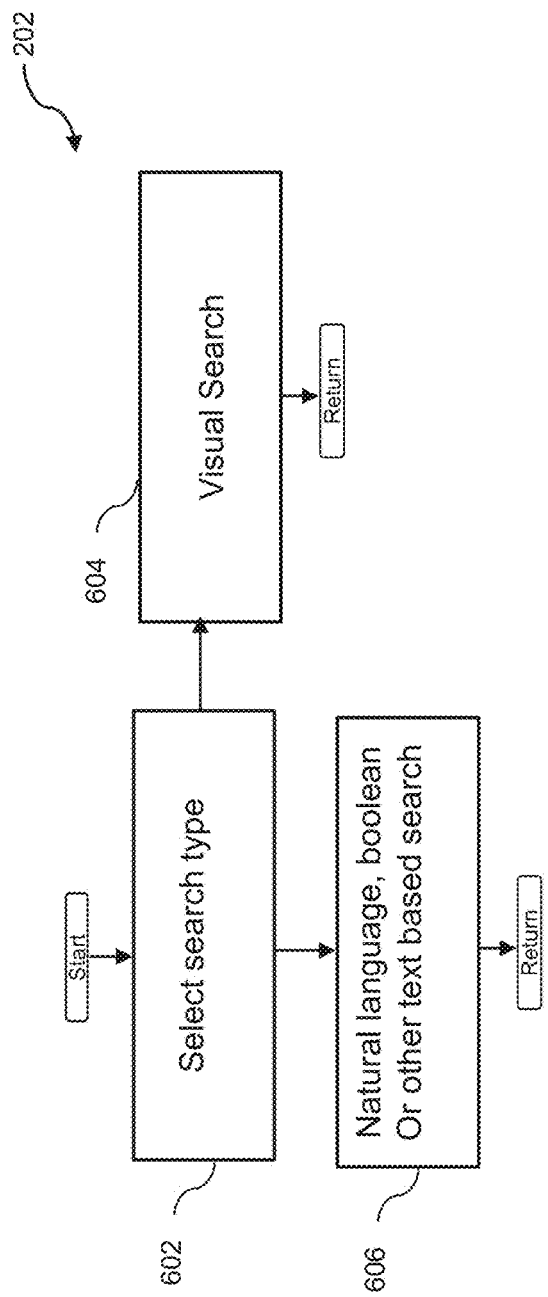
FIG. 6 is a high level operation flow diagram of a sub-process to conduct a search for plants in accordance with the present invention.

FIG. 6 is a high level operation flow diagram of sub-process 202 to conduct a search for plants in accordance with the present invention. Block 602 allows a user to select the type of plant search to conduct. If the user selects visual search, then flow continues to block 604. If the user selects a non-visual search, flow continues to block 606. The methods for a non-visual search may include natural language, Boolean, or a combination of natural language and Boolean search terms. The methods for conducting a natural language search or Boolean search are known in the art. The Plant Book is a commercial instantiation of a plant database as implemented by the commercial GWGS garden platform.

One of the unique features of GWGS is the visual search. The Plant Book based visual search sub-process 202 provides the ability to identify plants in one's physical environment by scanning an image of the variety and uploading to a database which may perform image recognition to feedback relevant information. This can also be done manually. A categorization process is contemplated which relies on physical attributes of plants to help the member hierarchically shift through a relevant image database until a visual match is achieved.

The plant database is a collection of digitally stored electronic plant records. Each plant record can be associated to multiple plant properties. A plant property can be of any data type (i.e. integer, image, class, text, etc.). In this way each plant record can be tagged with information which identifies it and which can be used to associate it to other plant records.

It is desirable to conduct a visual plant search wherein the user is interested in identifying a plant they have seen growing in another garden or identifying a plant that they are not already familiar with but are interested in. A text base search is frequently a poor choice since the user likely does not have knowledge of textual identifiers for the plant (genus, species, technical plant knowledge). The visual search to address this problem should be structured so that the best possible search match is made in the fewest steps possible. To achieve identification, the user is posed questions to which the user responds by way of selecting from a choice of images that more closely represents a feature of the plant. The order and detail of the questions to be asked are based upon a level of specificity.

Specificity is a measure of the ability of a question to identify records that should be correctly rejected while not including results that should have been rejected. Define "true negatives" as the amount of correctly identified items that are removed by asking a question. Further define "false positive" as the amount of records that should have been excluded from further search results, but were not. Specificity is therefore defined as:

$$\text{Specificity} = (\text{true negatives})/(\text{true negatives} + \text{false positives}).$$

Specificity can range from 0% to 100% as a percentage, or range from 0 to 1. Because every human being has different preferences, the actual specificity for any one given question in a search, apriori, is a probabilistic value versus a deterministic value.

Specificity becomes deterministic only after the search is completed and the correct result is compiled. In order to establish a robust visual search that is appealing for users, for the visual search in the preferred embodiment the specificity of questions evolves iteratively. Instead of actual specificity values for questions, a relative rank of specificity of questions is established. Knowledge from experienced gardeners is collected to determine the initial hierarchical rank of question specificity. An example of a question specificity ranking determination may be associated with plant color. For example all plants that have chlorophyll contain some green color. Therefore, a question that asks the user if the plant contains any green parts will not likely remove any plant records from the search. Alternatively, for a question which might be used which is higher in specificity, for example, "what color is the flower of the plant?", there will be some plants which are removed from the list of possible plants because some plants to not share the same color flowers. Flower color is a fairly high specificity question as there are many plants which may be excluded on the basis of color.

Initially, specificity ranking is performed heuristically. In the preferred embodiment, the following question initial specificity ranking will be used:
  I. What do you have?
  II. Geographic area (zip code or city)
  III. Picture of or Whole Plant, Leaf, Seed, Flower, Fruit, Stalk or Vine
    A) Determine Kind;
      i. Dicot
      ii. Monocot
      iii. Fern/Fungi
    B) Determine Plant Type;
      i. Tree,
        i. Bark, foliage, size, flower
      ii. shrub,
        i. Bark, foliage, size
      iii. Plant,
        i. Stem
      iv. flower
    C) Determine Size;
      i. Age
      ii. Plant Type
    D) Determine Stalk;
      i. Color
      ii. Texture,
      iii. Thickness
      iv. Growth Habit (vine)
      v. Stalk Cross-sectional
      vi. Shape, etc.
    E) Determine Foliage;
      i. Margin and Shape
      ii. Age
      iii. Size
      iv. Color,
      v. Venation
      vi. Texture
    F) Determine Vegetable or Fruit;
      i. Color
      ii. Texture
      iii. Size
      iv. Taste
      v. Smell
      vi. Shape
      vii. Skin Texture
      viii. Seeds Additional questions can be added in the future. Initially, the specificity value will be equally spaced from 0 to 1 (or 0% to 100%). Adjustments are made as user searches are conducted and deterministic specificity values can be ascertained.

To further enable robustness in a visual search, plant records are, apriori, categorized in the plant database by visual similarity characteristic. A visual similarity characteristic score is defined as a linear combination of plant attribute scores, $Q_n$, for $n=1,2,3\ldots$, wherein an individual plant attribute score is equal to 1 if the plant exhibits that particular attribute, and 0 otherwise. For example, the table below illustrates a similarity characteristic score (similarity) for eight plants:

| Plant Records | Flower Color, yellow | Leaf, lobed | Veining, parallel | Q1 | Q2 | Q3 | Similarity |
|---|---|---|---|---|---|---|---|
| Plant 1 | 1 | 0 | 0 | 1 | 0 | 0 | 1 |
| Plant 2 | 0 | 1 | 0 | 0 | 1 | 0 | 1 |
| Plant 3 | 0 | 0 | 1 | 0 | 0 | 1 | 1 |
| Plant 4 | 0 | 0 | 0 | 0 | 0 | 0 | 0 |
| Plant 5 | 1 | 1 | 1 | 1 | 1 | 1 | 3 |
| Plant 6 | 0 | 1 | 1 | 0 | 1 | 1 | 2 |
| Plant 7 | 1 | 1 | 0 | 1 | 1 | 0 | 2 |
| Plant 8 | 1 | 0 | 0 | 1 | 0 | 0 | 1 |

In this example, plants 1, 5, 7 and 8 have a yellow flower color. Plants 2, 5, 6, and 7 have lobed leaf structures, and plants 3, 5 and 6 have parallel leaf veining. The individual plant attribute scores, Q1, Q2, and Q3 correspond, respectively, to flower color, leaf structure, and veining. The similarity is then calculated in this example to be the sum of the individual attribute scores (Q1+Q2+Q3). The similarity score in this example was a simple sum of individual attribute scores. The similarity score may be a more general linear combination of individual attribute scores wherein an individual attribute score may be weighted more than another individual attribute score. The reason for this is that some attributes may be more important to a user or may be more useful in conducting a visual search. An example may be where flower color is weighted more than veining, since flower color is a more readily identifiable attribute than veining.

Figure 7:
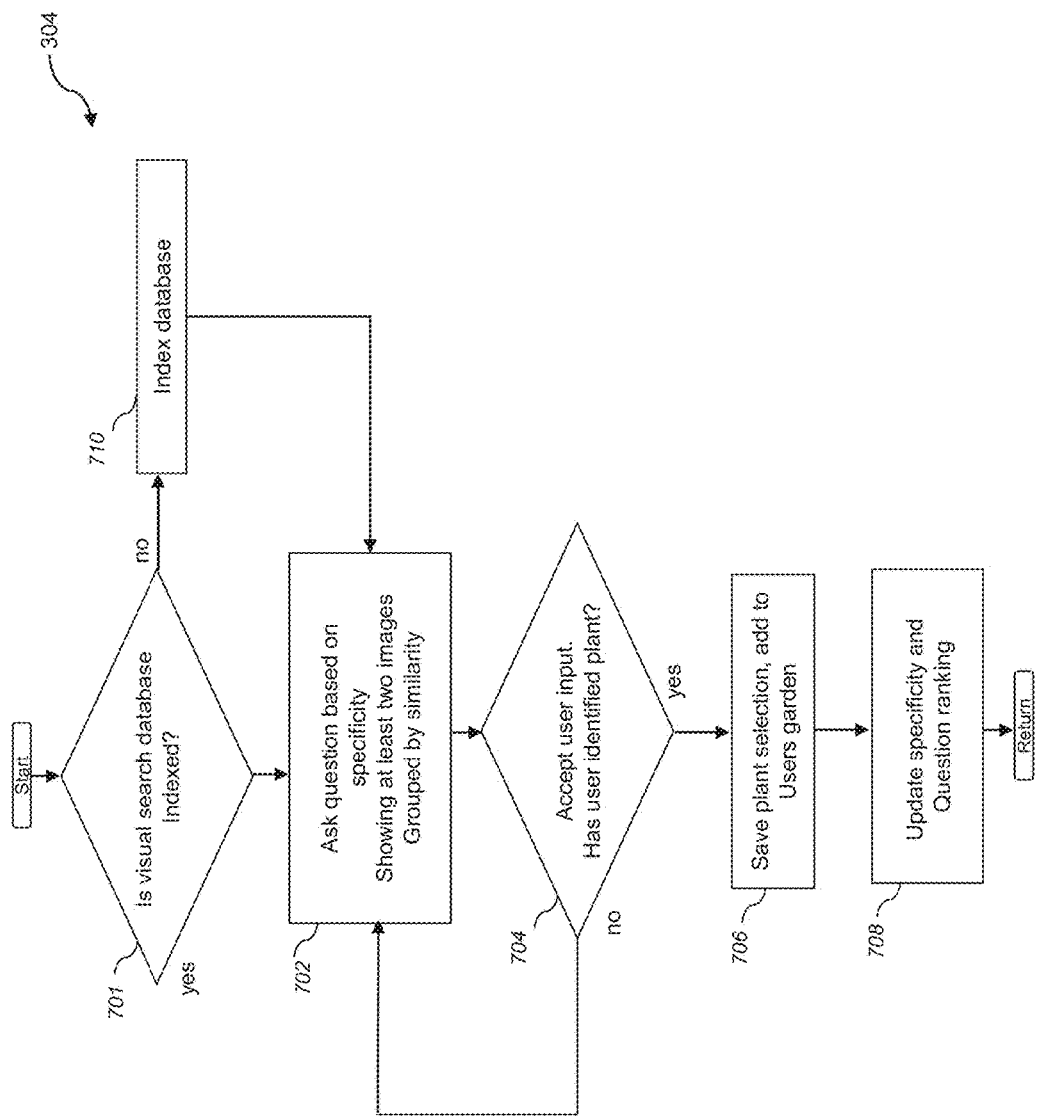
FIG. 7 is a high level operation flow diagram to conduct a visual search for plants in accordance with the preferred embodiment.

FIG. 7 is a high level operation flow diagram to conduct a visual search for plants in accordance with the preferred embodiment. Flow begins at block 701 wherein the plant database used for visual searching is checked to see if it is indexed. Indexing is where relevant pointers into the database are maintained for quick access. Indexing is well known in the art. New plant records may be added to the database at any time, and these new plant records may not have been indexed. To include the greatest possible records available for visual searching, it is desirable to have the plant database fully indexed. If the plant database is not fully indexed, then flow continues to block 710 wherein the database is indexed. After indexing, flow continues to 702. If the plant database is already fully indexed in block 701, then flow also continues to block 702 wherein a visual search question is asked. A visual search question ("question") may comprise a combination of text and at least two visual identifiers or visual images. For example, there may be a text question asking if the plant is a tree, shrub, plant, or flower and a set of images may be included which may or may not correspond to the plant type. When there are more than two images to be displayed by the UI, the images displayed are grouped by similarity range. Similarity range is the range of similarity values that are considered to be grouped together. The grouping of similarity values may have included multiple similarity ranges that have disparate ranges. For example, visual identifiers that have a similarity value of between 8 and 10 are grouped together and displayed together by the graphical user interface. Furthermore, visual identifiers that have a similarity value of between 2 and 6 may be grouped together and displayed together. Flow then continues to block 704 wherein a user may select at least one visual image. A user may also discern that the plant they have selected is the one the user was searching for. If the user has identified the plant they wanted to identify, then flow continues to block 706 wherein the user is given the option to save the plant selection to their garden, receive notification of the selected plant's biological information, or to conduct a new search. If block 704 determines that the user has not yet identified the plant, flow continues to block 702 wherein a new question based upon specificity showing at least two images, grouped by similarity is displayed by the UI. When the user has completed the plant selection in block 706, flow continues to block 708. Block 708 calculates the actual specificity value for at least one question, based upon the number of actual questions asked. The specificity ranking of questions may be updated to reflect the updated specificity values and the process returns. Visual search 304 stores the plant records that were selected and not selected throughout the entire iterative question asking process in order to retroactively calculate actual specificity. As an example, if 8 questions were asked, wherein the last question had 2 final candidate plants, and one was selected as the correct plant that the user was searching for, questions 1-7 can be examined for their level of specificity because the number of false positives and true negatives for the particular search can be calculated in a deterministic manner. The more questions that had to be asked to arrive at a conclusive search selection, the higher the likelihood that the actual specificity of the previous questions used to arrive at a conclusive search selection is valid. The specificity ranking update may then include a weighted modification based upon the number of questions that the particular search required to reach a conclusive search selection.

Figure 8:
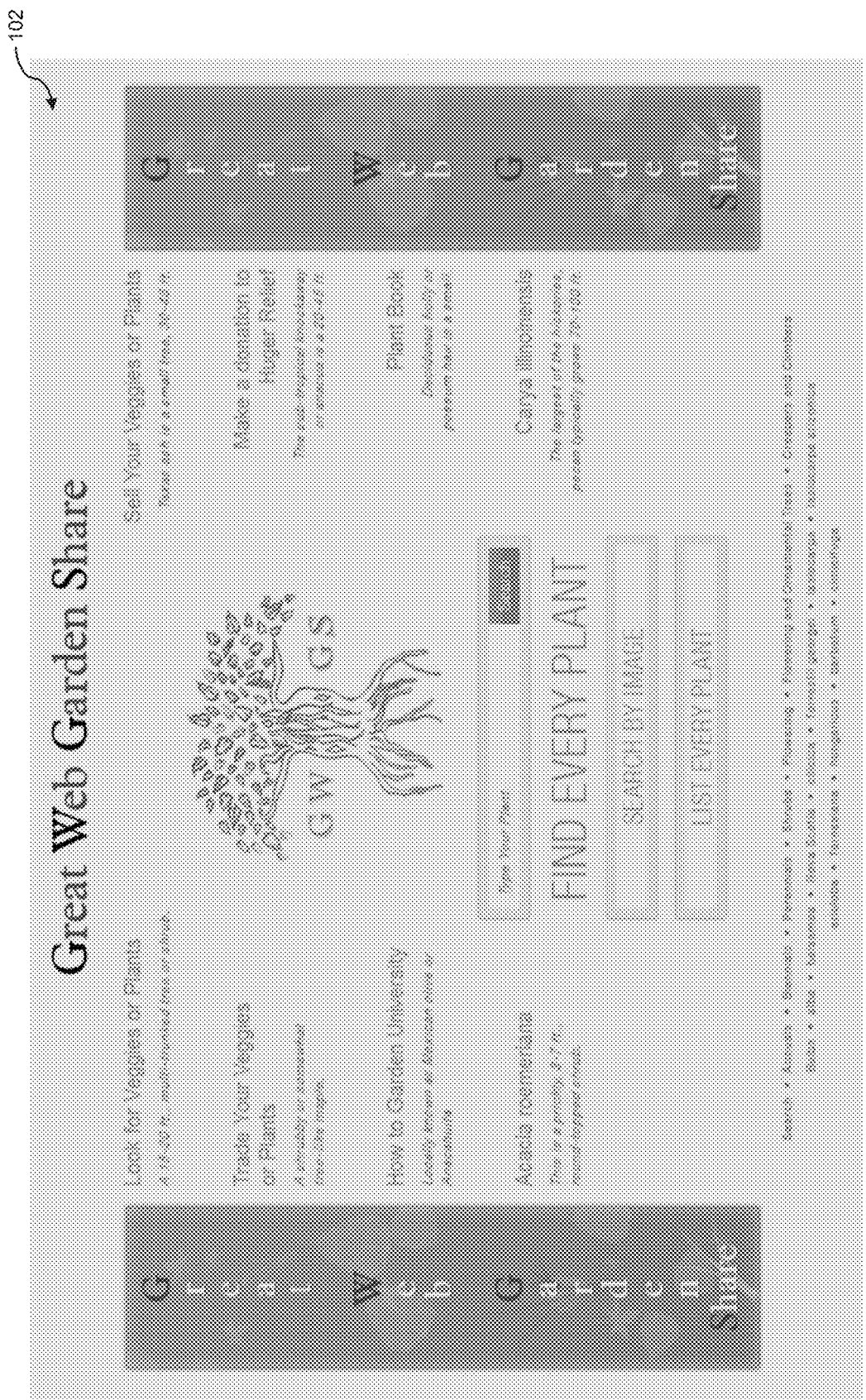
FIG. 8 shows an aspect of a display user interface (UI) of the Great Web Garden Share (GWGS) functional page in accordance with the present invention.

FIG. 8 shows an aspect of the display user interface (UI) of the Great Web Garden Share (GWGS) functional page in accordance with the present invention. Hyperlinks, as known in the art, are utilized to facilitate selection of desired functionality.

FIG. 9 shows another aspect of display user interface (UI) of the Great Web Garden Share (GWGS) modify gardens sub-process 220 in accordance with the present embodiment. The display UI for sub-process 220 is especially desirable and useful because users can quickly ascertain the configuration of their garden. Grid 904 is a graphical representation that corresponds to the physical instantiation of a user's garden. Each element of grid 904 contains a hyperlink which enables plant information to be entered for a particular cell. Cell 902 is representative of all cells in grid 904. Each cell on the display represents the relative physical proximity to the actual garden ("Wysiwyg"). When a garden is created, the cells of grid 904 may have numerical representation. Upon completion of selecting the particular plant for a particular cell, an image, if available, is displayed in the corresponding cell location. For example, cell 902 was selected to contain the vegetable beets. The plant database picture for beets is displayed in cell 902. Note that cell 902 remains a hyperlink, allowing the item to be quickly edited. To facilitate population and modification of a user's garden, plant picture bar 910 is provided along with scroll capability 908. Items in plant picture bar may also be hyperlinks to additional information about that plant. A user may drag and drop an element from plant picture bar 910 into a particular cell in grid 904, wherein grid 904 will update the corresponding particular cell with the plant information that was dragged and dropped. Dragging and dropping is known in the art, but novel in combination with grid 904 corresponding to a physical representation of plants in a user's garden. Finally, pull-down menu 906 facilitates quick selection between multiple gardens that a user may have. The UI of the Great Web Garden Share (GWGS) may also include visual identifier 905 and visual alert 907. Visual identifier 905 may be used to indicate a unique condition of that particular plant. For example, the plant which has visual identifier 905 overlaid on it may indicate that the represented plant is experimental or indicate that a plant experiment is being conducted. The user may find this graphical visual identifier useful to keep track of experiments. Visual alert 907 is a graphical user interface instance of functionality provided by sub-process 210 wherein visual alert 907 easily notifies the garden user that there is a pending alert. Hovering a mouse pointer over either visual alert 907 or visual identifier 905 may result in a "pop-up" window within the graphical user interface, wherein the information related to visual alert 907 or visual identifier 905 may be displayed. Clicking on either visual alert 907 or visual identifier 905 may allow the user to modify the respective properties of these items.

Each plant record will have associated visual tags. These visual tags can be in the form of images and will be used in order to conduct the plant identification search. Due to the large number of botanical properties which correspond to particular plant geometry, these geometry-based botanical properties vary from common to very uncommon. That is, some geometry-based botanical properties are considered common if they are shared by all or most plants in the plant world, and in the same way geometry-based botanical properties are considered uncommon if they are shared by only a small percentage of the plants in the plant world.

Figure 10:
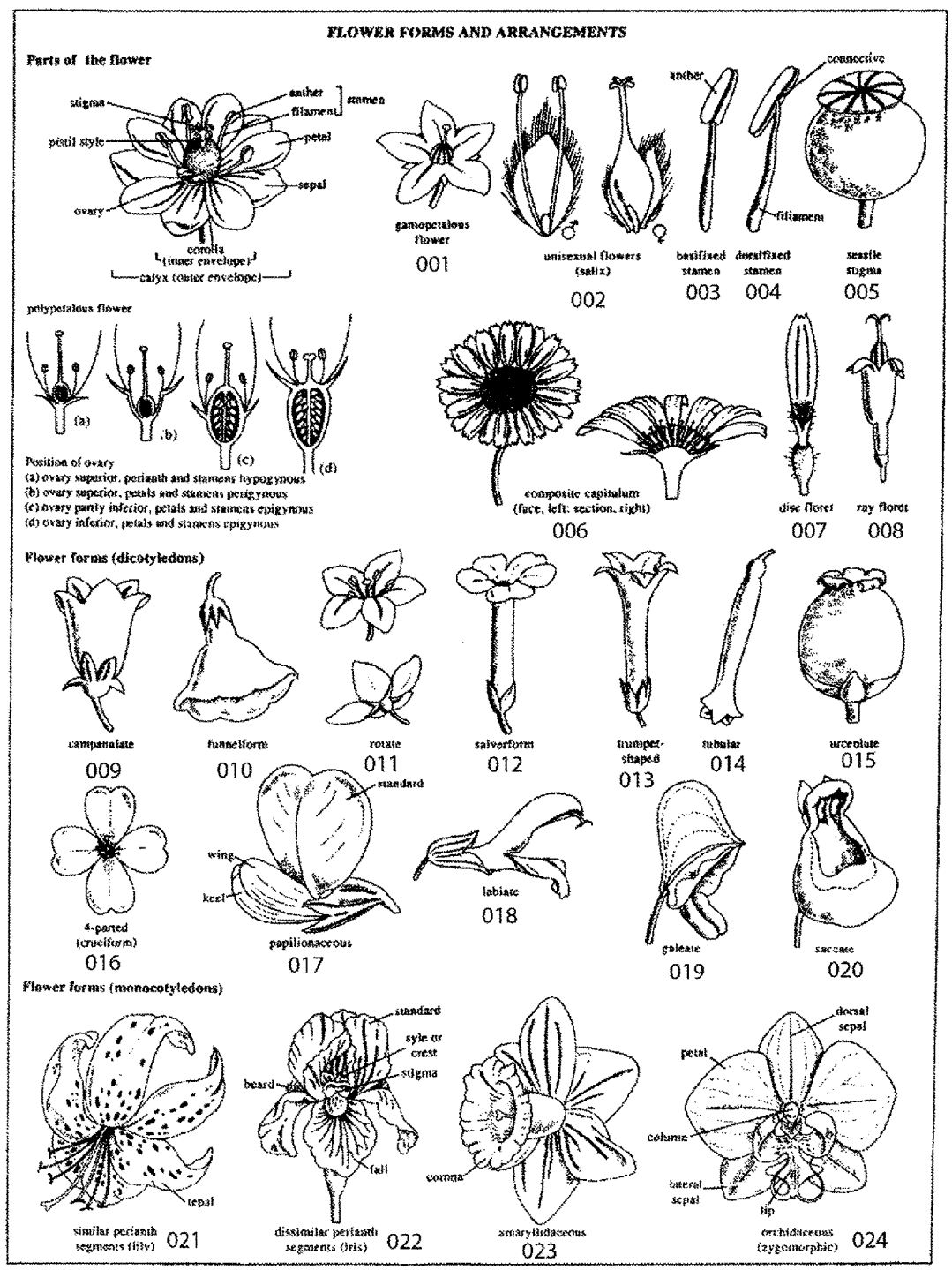
FIG. 10 shows similar types of flower forms and arrangements that may be included in search for plants sub-process.

FIG. 10 shows similar types of flower forms and arrangements that may be included in search for plants sub-process 202. The ability to group flowers by similar shapes assists in the visual identification process. It is easier to identify a plant by clicking on an image the closest matches a user's preference as opposed to being asked questions about flower parts that a user has no knowledge of.

Figure 11:
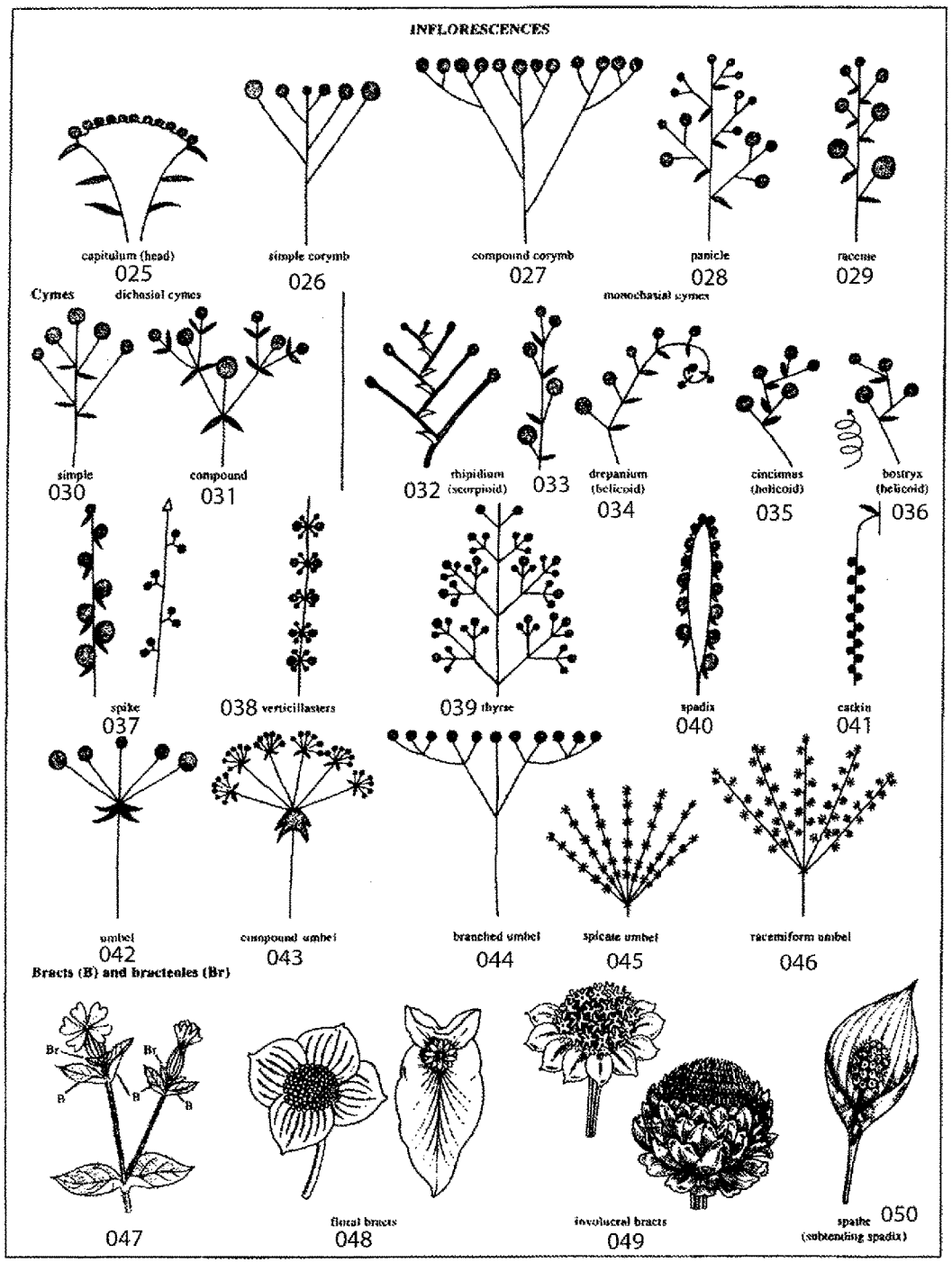
FIG. 11 shows similar types of plant inflorescences.

FIG. 11 shows similar types of plant inflorenscences. The ability to group plants by similar inflorenscences assists in the visual identification process. It is easier to identify a plant by click on an image that closest matches a user's preference as opposed to a user being asked to describe the inflorescence.

Figure 12:
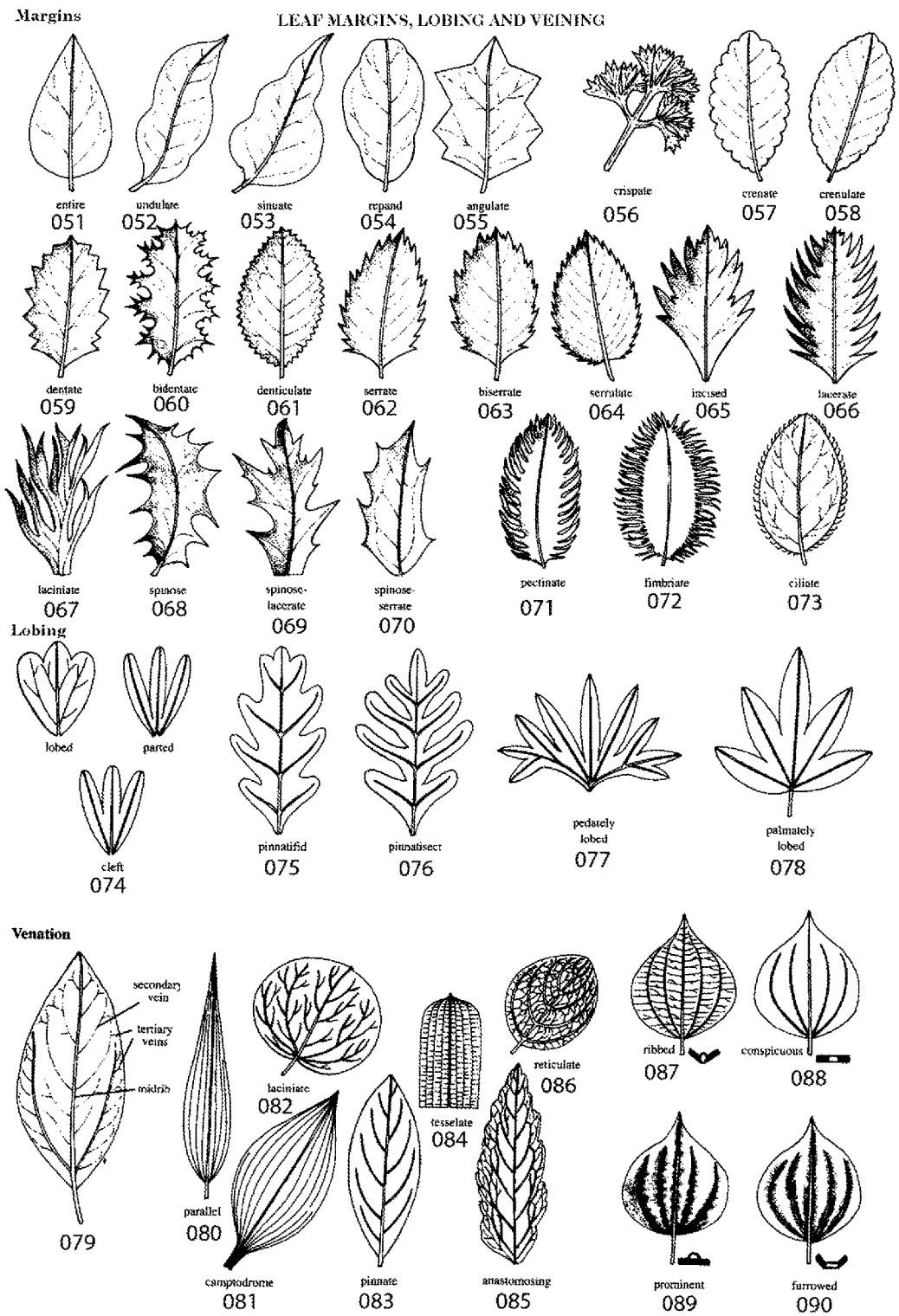
FIG. 12 shows plants with similar leaf margins, lobing, and veining.

FIG. 12 shows plants with similar leaf margins, lobing, and veining. The ability to group plants by similar margins, lobing, or veining assists in the visual identification process and may be an aspect of search for plants sub-process 202. It is easier to identify a plant by clicking on an image that closest matches a user's preference as opposed to a user being asked about a leaf's lobing.

Figure 13:
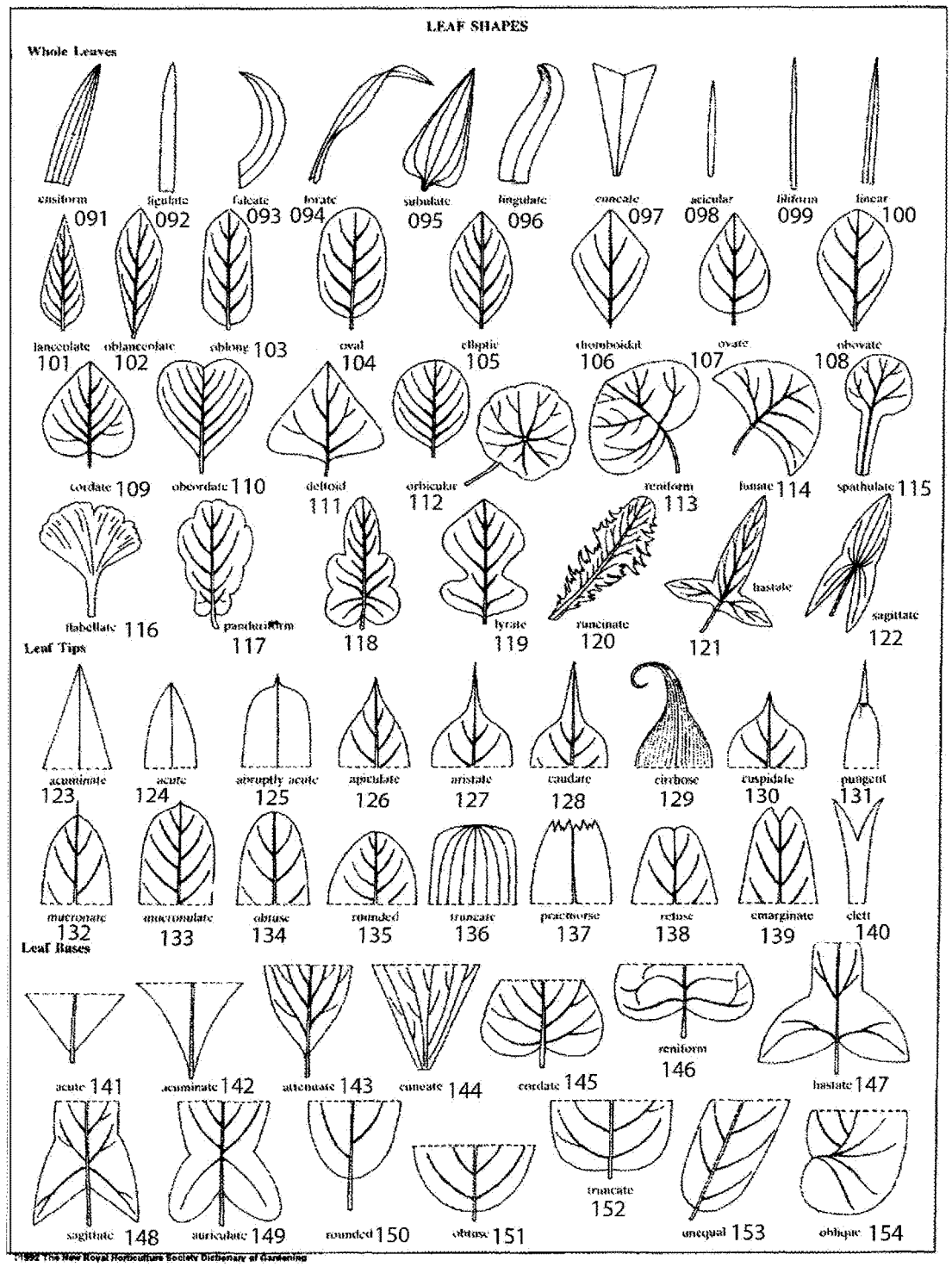
FIG. 13 shows plants with similar leaf shapes.

FIG. 13 shows plants with similar leaf shapes. The ability to group plants by similar leaf shapes assists in the visual identification process and may be an aspect of a visual search for plants sub-process 202. It is easier to identify a plant by clicking on an image that closest matches a user's preference as opposed to being asked about a leaf's shape.

Leaves that can grouped as similarly toothed leaf margins or similarly rounded can be grouped together and each geometry-based botanical property which is in that group can be given a similarity value corresponding to the similarity group it is contained within. As a result, they can be categorized with each similarity group carrying a magnitude in relation to the total number of records in the plant database. As such, the groups can be scaled from smallest to largest based on the number of plant records in common to each of the groups. Groups with the largest magnitude designate the most common features shared by plants, and groups with the smallest magnitude designate the least common features plants share. Using these quantities, the sequence of questions posed to the user by the dynamic search tool can be such that each question posed corresponds to the magnitude of the similarity group. The search tool will then select questions first from a high magnitude similarity group and, based on the response from the user, can then select a subsequent question from a similarity group of a lesser magnitude. This sequence can be continued until the plant record being searched for is found.

Figure 14:
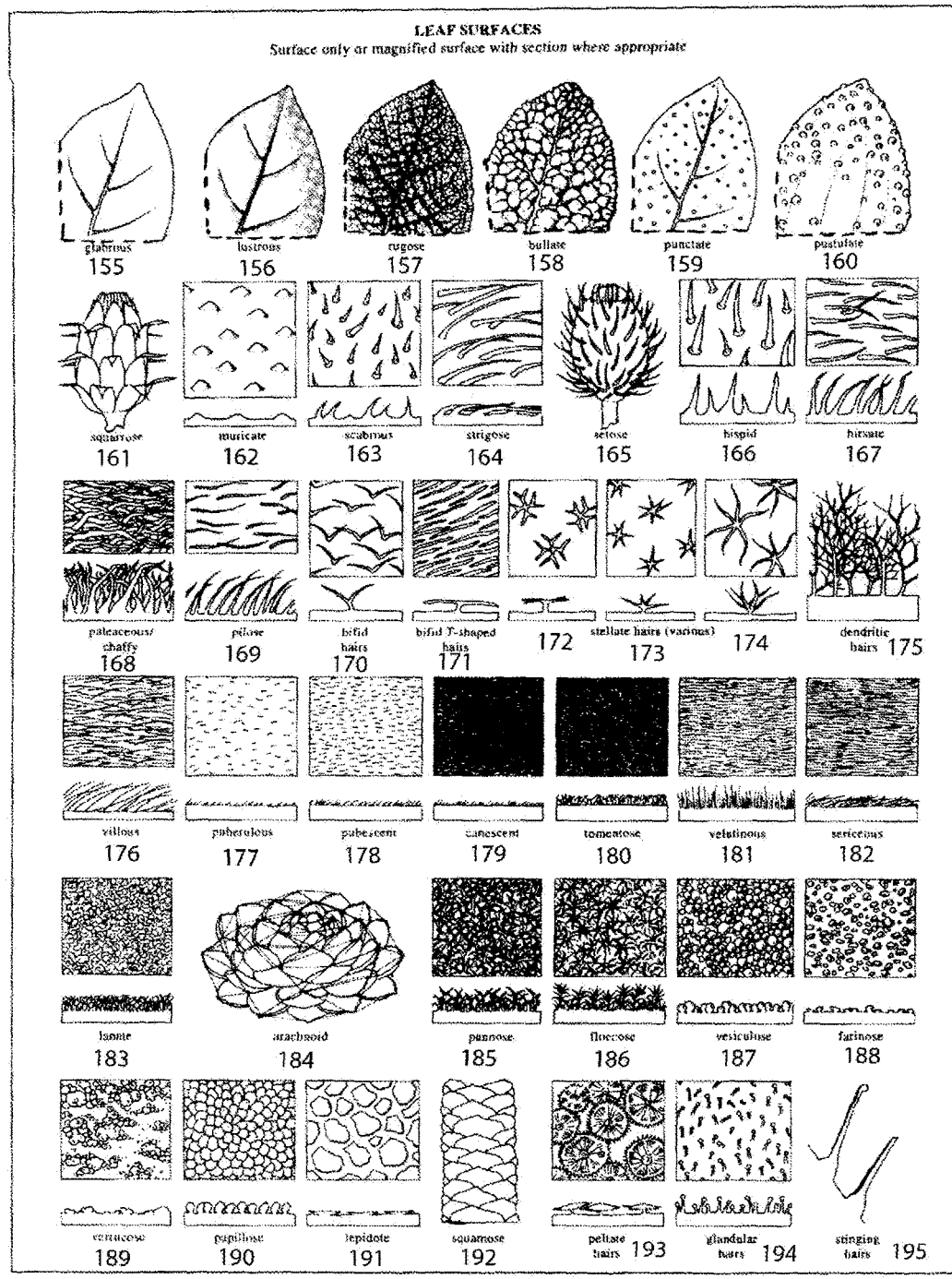
FIG. 14 shows various plant leaf surfaces.

FIG. 14 shows various plant leaf surfaces. The ability to group plants by similar leaf surfaces may assist in the visual identification search for plants sub-process 202.

Figure 15:
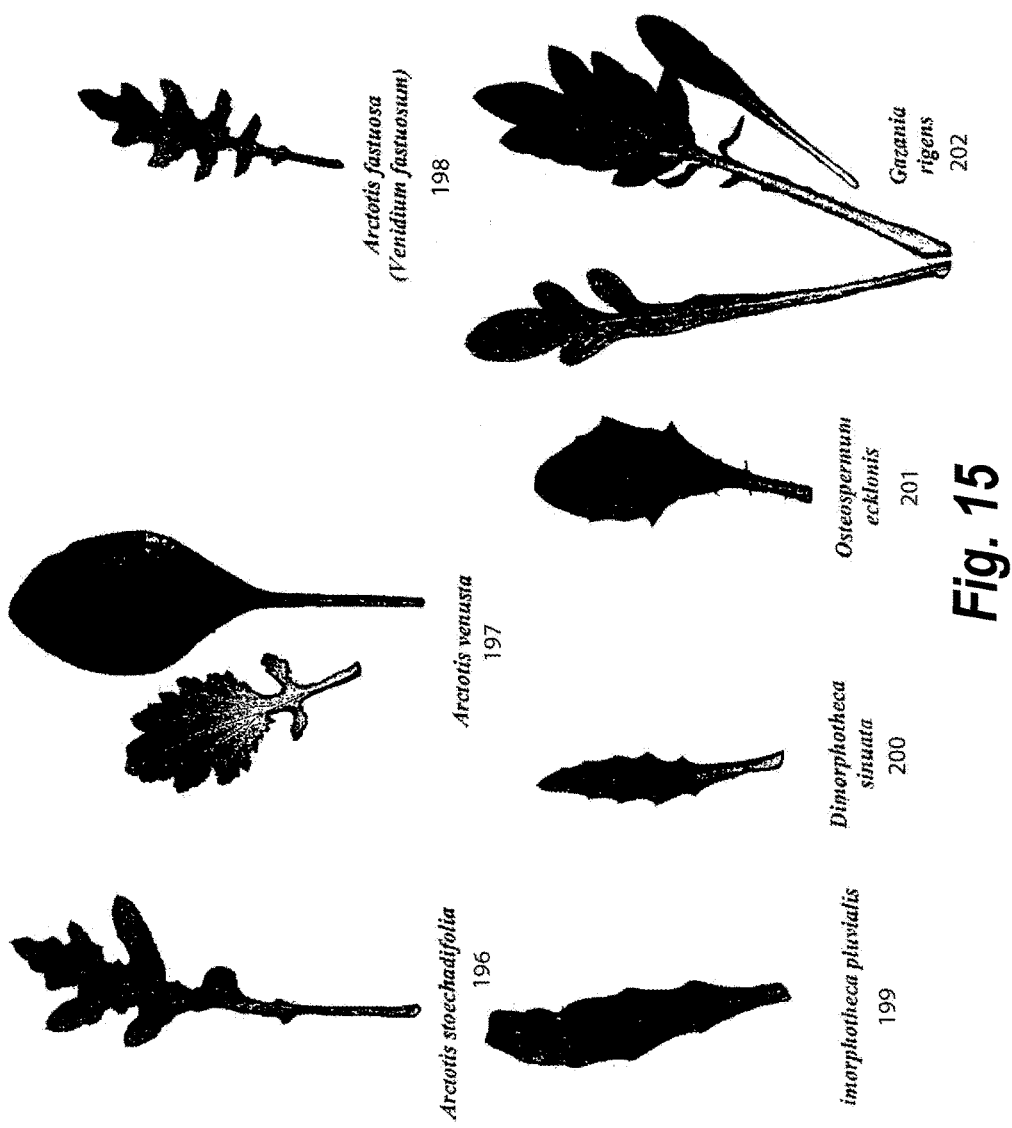
FIG. 15 shows plant leaf silhouettes.

FIG. 15 shows plant leaf silhouettes. A user can easily hold a leaf up to his computer screen and compare it to a displayed leaf. These images assist in the visual identification process for search for plants sub-process 202

FIG. 16 shows specific properties of plant information contained within a specific plant record in The Plant Book, the proper name given to GWGS plant database. The Plant Book strives to obtain as much information about plants as possible, including information ranging from "Plant ID Number/Key" to "Time for Feeding." Users may request additional property fields be added through sub-process 216 as detailed above, as well as provide information to fill-in missing information. All information may be verified by an authorized user such as a professional horticulturist.

FIG. 17 shows additional specific properties of plant information contained within a specific plant record in The Plant Book, including additional information ranging from "Amount to Feed" to "Flower Shape Properties 1 . . . n." Similar to FIG. 16, the Plant Book strives to obtain as much information about plants as possible, and users may request additional property fields be added through sub-process 216, as well as provide information to fill-in missing information, with all information being capable of verification by an authorized user such as a professional horticulturist.

FIG. 18 shows additional specific properties of plant information contained within a specific plant record in The Plant Book, including information ranging from "Flower Identification Properties 1 . . . n" to "Plant Maintenance Task Reminder (1 . . . n)." Similar to FIGS. 16-17, the Plant Book strives to obtain as much information about plants as possible, and users may request additional property fields be added through sub-process 216, as well as provide information to fill-in missing information, with all information being capable of verification by an authorized user such as a professional horticulturist.

The Plant Book is a library tool that includes a comprehensive database of plants and plant information, a one-stop-shop for relevant horticultural information. In another scenario, the Plant Book is a community-driven encyclopedia (very similar to WIKIPEDIA) with all information being reviewed and validated by platform approved horticultural experts.

As previously mentioned, a user is able to request a plant to be added to the directory through sub-process 216. The ability for users to request a plant be added to the main directory and to be able to perform searches thereon using botanical image identifiers is a unique feature of the invention.

By using botanical image identifiers, it is possible to construct a search based on images, and every plant on the planet can be defined and classified by the current botanical information available. For example, a plant's leaves can be broken down by its characteristics. One important characteristic is the leaf margin. The leaf margin defines the geometric periphery of the leaf. From a set of known leaf margins a subtractive or exclusionary search can be performed.

Another feature of the invention is sending reminders (alerts) based on local weather. The reminders are automated and may even be tailored to user defined settings.

In yet another feature of the invention, the platform functions as a futures contract marketplace and social network combined.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In an online garden platform for design, creation, maintenance, and information sharing of gardens by users of the online platform, a method comprising:
   generating a user interface for receiving information from the users of the online garden platform relating to gardens of the users;
   generating, in response to the information received by the user interface from the users of the online garden platform, a selection of plant varieties based on geographic and environmental information;
   providing at least one centralized plant database of user created garden knowledge containing the information received by the user interface from the users of the online garden platform, including the generated selection of plant varieties, the at least one centralized plant database being dynamically maintained and accessible by all of the users of the online garden platform; and
   performing plant identification searches by using geometry-based botanical properties in a visual search comprising multiple questions each containing text and at least two visual images grouped by a similarity range, the multiple questions being presented in an order according to a specificity ranking.

2. The method of claim 1, wherein the selection of plant varieties is offered for sale or trade.

3. The method of claim 1, wherein the user interface further comprises a visual identifier of a plant experiment that is shared among the users of the online garden platform.

4. The method of claim 1, wherein the user interface further comprises a visual alert.

5. The method of claim 1, further comprising enabling, via the user interface, the addition of plant information by the users to the at least one centralized plant database.

6. The method of claim 1, wherein the at least one centralized plant database contains digital content comprised of gardening related information including digital representations of plants in the gardens of the users of the online platform.

7. The method of claim 1, further comprising enabling, via the user interface, the sharing of a garden and garden data among the users of the online platform.

8. The method of claim 1, wherein the online platform is social community based and the users are members of an online community.

9. The method of claim 1, further comprising allowing, by the user interface, each of the users of the online platform to upload an image of a plant and to compare the plant image against other plant images in the at least one centralized plant database to help the user identify a variety of the plant.

10. The method of claim 1, further comprising allowing, via the user interface, the users of the online platform to search for other users of the online platform and to search for garden types using parameters including climate and/or plant type.

11. The method of claim 1, wherein the user created garden knowledge contains data from sensors placed in the gardens of the users of the online platform, the sensors being coupled to the online garden platform.

12. An online garden platform for design, creation, maintenance, and information sharing of gardens by users of the online garden platform, comprising:
   a processor;
   a memory configured to provide computer program instructions to the processor;
   a module to generate a user interface for receiving information from the users of the online garden platform relating to gardens of the users;
   a module to generate, in response to the information received by the user interface from the users of the online platform, a selection of plant varieties based on geographical and environmental information;
   a module to provide at least one centralized plant database of user created garden knowledge containing information received by the user interface from the users of the online garden platform, including the generated selection of plant varieties, the at least one centralized plant database being dynamically maintained and accessible by all of the users of the online garden platform; and
   a module to perform plant identification searches by using geometry-based botanical properties in a visual search comprising multiple questions each containing text and at least two visual images grouped by a similarity range, the multiple questions being presented in an order according to a specificity ranking.

13. The online garden platform of claim 12, wherein the selection of plant varieties is offered for sale or trade using a barter system.

14. The online garden platform of claim 12, wherein the user interface further comprises a visual identifier of a plant experiment that is shared among the users of the online garden platform.

15. The online garden platform of claim 12, wherein the user interface further comprises a visual alert.

16. The online garden platform of claim 12, wherein the user interface is configured to: enable the addition of plant information by the users to the at least one centralized plant database; enable the sharing of a garden and garden data among the users; enable each of the users to upload an image of a plant and to compare the plant image against other plant images in the at least one centralized plant database to help the user identify a variety of the plant; and enable the users to search for other users of the online platform and to search for garden types using parameters including climate and/or plant type.

17. The online garden platform of claim 12, wherein the at least one centralized plant database contains digital content comprised of gardening related information including digital representations of plants in the gardens of the users of the online platform.

18. The online garden platform of claim 12, wherein the user created garden knowledge contains data from sensors placed in the gardens of the users of the online platform, the sensors being coupled to the online garden platform.

19. A computer program product including a non-transitory computer program medium that aids users in the design, creation, maintenance, and information sharing of gardens of the users, and includes instructions to:
generate a user interface for receiving information from the users relating to the users' gardens;
generate, in response to the information received by the user interface from the users, a selection of plant varieties based on geographic and environmental information;
provide at least one centralized plant database of user created garden knowledge containing the information received by the user interface from the users, including the generated selection of plant varieties, the at least one centralized plant database being dynamically maintained and accessible by all of the users; and
perform plant identification searches by using geometry-based botanical properties in a visual search comprising multiple questions each containing text and at least two visual images grouped by a similarity range, the multiple questions being presented in an order according to a specificity ranking.

20. The computer program product of claim 19, wherein the non-transitory computer program medium further includes instructions to enable the addition of plant information by the users to the at least one centralized plant database; enable the sharing of a garden and garden data among the users; enable each of the users to upload an image of a plant and to compare the plant image against other plant images in the at least one centralized plant database to help the user identify a variety of the plant; and enable the users to search for other users' gardens and to search for garden types using parameters including climate and/or plant type.

21. The computer program product of claim 19, wherein the at least one centralized plant database contains digital content comprised of gardening related information including digital representations of plants in the users' gardens.

22. The computer program product of claim 19, wherein the user created garden knowledge contains data from sensors placed in the users' gardens, the data being garden information including temperature, humidity and/or wind speed.

* * * * *